Nov. 2, 1954  D. F. STODDARD  2,693,028
TREE GIRDLING SPUD
Filed March 1, 1952

Daniel F. Stoddard
*Inventor* by  Edward C. Taylor
*Attorney*

United States Patent Office 2,693,028
Patented Nov. 2, 1954

2,693,028
TREE GIRDLING SPUD

Daniel F. Stoddard, Bethel, Vt.

Application March 1, 1952, Serial No. 274,330

1 Claim. (Cl. 30—121)

This invention relates to a spud for girdling trees. A recent development in the cutting of pulpwood is killing the trees chemically before cutting so that the bark will peel off by itself. It has hitherto been necessary to remove the bark by hand prior to grinding, and the chemical removal has proved much less expensive. The chemical is applied to the bare wood in a girdle from which the bark has been removed. The girdle is usually six or eight inches wide and extends completely around the trunk. The usual girdling tool is the axe, but it has been found that if cuts are made into the wood the chemical will be blocked off from being carried up the tree above the cut and there will thus be vertical strips along which the bark does not peel off by itself. It is the object of the present invention to produce a spud which will girdle a tree more rapidly than an axe and which will have no tendency to cut into the wood.

Figure 1:
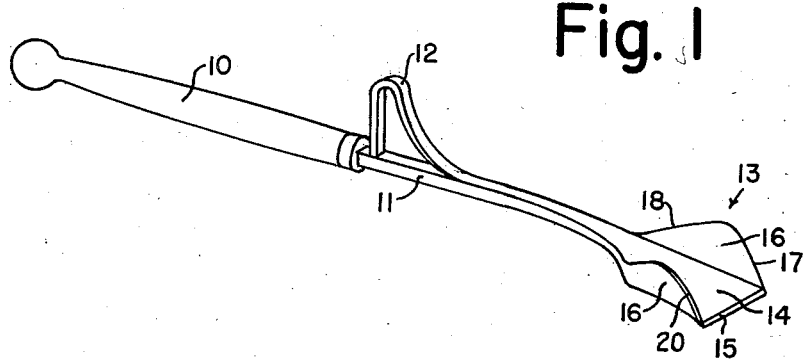
Figure 2:
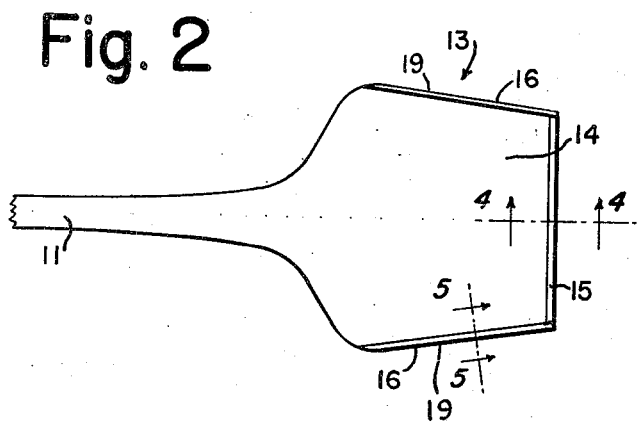
Figure 4:
Figure 5:
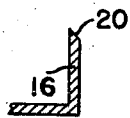
Figure 3:
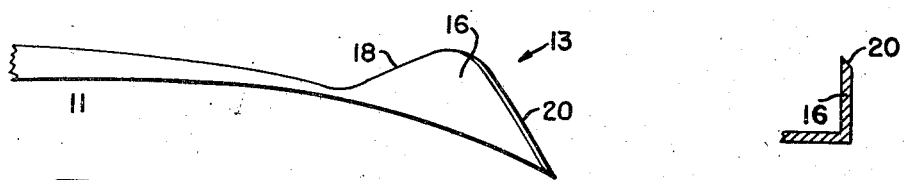

The invention will now be described with reference to the accompanying drawings, in which Fig. 1 is a perspective view of the spud;
Fig. 2 is an enlarged view of the spud, looking from the top in Fig. 1;
Fig. 3 is a side view of Fig. 2;
Fig. 4 is a partial section on line 4—4 of Fig. 2; and
Fig. 5 is a partial section on line 5—5 of Fig. 2.

The spud is provided with a wooden handle 10 into which the shank 11 of the spud is fitted. A second handle 12 of wrought iron is welded to the shank so that the user can grasp the tool with both hands. Forwardly of the handle 12 the shank widens (Fig. 2), curves downwardly (Fig. 3), and preferably becomes thinner as is also shown in the latter figure. At its forward end it merges into the spud proper 13 which has a bottom 14 having a slight longitudinal curvature to fit around the tree, but which is flat in a transverse direction to lie flat against the vertical tree trunk. The forward end of the bottom is beveled at 15 to form a cutting edge, the bevel being on the side away from the tree. At each side of the bottom 14, and either formed integrally with it or welded to it, are cutters 16 initially slanting upwardly from the bottom as shown at 17 in Fig. 1 and then bending back as at 18 to merge with the shank. The cutters 16 also diverge from each other in a direction away from the cutting edge 15, as shown at 19 in Fig. 2. Cutters 16 are beveled from the outside inwardly at 20 (Fig. 5) to form cutting edges.

In use the spud is pressed against the tree with the handle horizontal and with the concave side of the bottom 14 facing the tree. It is then passed completely around the tree, the cutting edge 15 separating the bark from the wood and the cutting edges 20 severing the bark to be removed from the bark adjacent to it. With a little practice the exact angle at which the spud should be held can be determined so that clean separation of the bark from the wood will occur without having the edge 15 dig into the wood itself. The divergence of the cutters 16 prevents any wedging of the bark within the spud.

What I claim is:

A device for girdling trees comprising a handle engaging shank and three cutting blades fixed forwardly thereon, the first of said blades being flat transversely and concave longitudinally in extension of the shank whereby it fits the roundness of a tree trunk, a cutting edge at the front of said first blade, said cutting edge being beveled on the convex side of the blade, the second and third blades being upstanding at about right angles to the convex side of the first blade and diverging rearwardly from its cutting edge, each of said second and third blades being sharpened at the leading edge thereof whereby a clean cut is attained, the cutting edges of said upstanding blades being slanted rearwardly whereby cutting efficiency is improved.

References Cited in the file of this patent

UNITED STATES PATENTS

| Number | Name | Date |
|---|---|---|
| 972,225 | Pennell | Oct. 11, 1910 |
| 1,160,439 | Nicholas | Nov. 16, 1915 |
| 2,010,414 | Rekonty | Aug. 6, 1935 |
| 2,092,550 | Davis | Sept. 7, 1937 |

FOREIGN PATENTS

| Number | Country | Date |
|---|---|---|
| 33,387 | Norway | Oct. 24, 1921 |